United States Patent
Dufrene et al.

(10) Patent No.: US 9,780,992 B2
(45) Date of Patent: Oct. 3, 2017

(54) METHOD FOR MANAGING THE STARTUP OF INSTANCES OF APPLICATIONS ON VIRTUAL MACHINES OF A DISTRIBUTED NETWORK

(71) Applicant: Schneider Electric Industries SAS, Rueil Malmaison (FR)

(72) Inventors: Pierre Dufrene, Tourettes sur Loup (FR); Guenther Schmitt, Grossostheim (DE)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 411 days.

(21) Appl. No.: 13/902,373

(22) Filed: May 24, 2013

(65) Prior Publication Data

US 2013/0318147 A1 Nov. 28, 2013

(30) Foreign Application Priority Data

May 25, 2012 (FR) ...................................... 12 54871

(51) Int. Cl.
*H04L 29/08* (2006.01)
*G06F 9/455* (2006.01)
*G06F 9/50* (2006.01)

(52) U.S. Cl.
CPC .... *H04L 29/08135* (2013.01); *G06F 9/45533* (2013.01); *G06F 9/5027* (2013.01)

(58) Field of Classification Search
CPC ........................ H04L 29/08135; G06F 9/45533
USPC ....................................................... 709/201
See application file for complete search history.

(56) References Cited

U.S. PATENT DOCUMENTS

| | | | |
|---|---|---|---|
| 8,453,148 B1 * | 5/2013 | Hobbs | ........................... 718/102 |
| 8,799,888 B1 * | 8/2014 | Fitzgerald et al. | ........... 717/170 |
| 2002/0138666 A1 * | 9/2002 | Fujisawa | ................... G06F 8/61 |
| | | | 719/330 |

(Continued)

FOREIGN PATENT DOCUMENTS

EP 2 437 165 A1 4/2012

OTHER PUBLICATIONS

French Preliminary Search Report and Written Opinion issued Dec. 10, 2012, in French 1254871, filed May 25, 2012 (with English Translation of Categories of Cited Documents).

*Primary Examiner* — Jerry Dennison
(74) *Attorney, Agent, or Firm* — Oblon, McClelland, Maier & Neustadt, L.L.P.

(57) ABSTRACT

The present invention relates to a method for selecting a virtual slot to start up an instance of an application in a distributed system comprising a plurality of physical machines distributed on a network, each physical machine housing at least one virtual machine, and each virtual machine comprising at least one virtual slot for running an application instance in said virtual machine.

The method according to the invention comprises selecting an application slot to start up an instance of an application including the following steps:
  determining a set of free application slots, i.e., those not occupied by an application instance in use,
  computing a score for each free application slot, the score computation depending on at least one constraint,
  selecting the application slot to start up the considered application instance, said selected application slot being that having the best score.

14 Claims, 2 Drawing Sheets

(56) References Cited

U.S. PATENT DOCUMENTS

| | | | |
|---|---|---|---|
| 2004/0154016 A1* | 8/2004 | Randall | G06F 9/45537 |
| | | | 718/1 |
| 2009/0138883 A1 | 5/2009 | McLean | |
| 2011/0231899 A1 | 9/2011 | Pulier et al. | |
| 2012/0131577 A1* | 5/2012 | Arcese et al. | 718/1 |
| 2012/0221699 A1* | 8/2012 | Moriyasu et al. | 709/223 |
| 2013/0060838 A1* | 3/2013 | Yaffe | G06F 9/5027 |
| | | | 709/203 |
| 2013/0275968 A1* | 10/2013 | Petev | G06F 9/5077 |
| | | | 718/1 |
| 2014/0282536 A1* | 9/2014 | Dave | G06Q 30/0631 |
| | | | 718/1 |
| 2015/0106805 A1* | 4/2015 | Melander | G06F 9/45537 |
| | | | 718/1 |

\* cited by examiner

METHOD FOR MANAGING THE STARTUP OF INSTANCES OF APPLICATIONS ON VIRTUAL MACHINES OF A DISTRIBUTED NETWORK

TECHNICAL FIELD OF THE INVENTION

The present invention relates to a method for starting up instances of applications on virtual machines distributed on a network. In a distributed system comprising a set of physical machines and equipment, and whereof the physical machines, corresponding to client stations or servers, house virtual machines capable of running applications, the invention relates to the selection of a virtual slot within a virtual machine to run an instance of an application therein.

BACKGROUND OF THE INVENTION

Today, the known distributed systems using a plurality of physical machines housing virtual machines to run applications are programmed manually so as to determine, as a function of criteria, which virtual machine must be addressed to run an instance of an application upon request from a client station.

The main criterion used is then based on the availability of hardware resources, memory, and computing power.

Another known technology to manage running applications on a network of virtual machines is based on the use of the so-called type 1 hypervisor. Reference may be made to document EP 1,067,461 A1 for an illustration of technology using the principle of such a hypervisor. However, the use of a type 1 hypervisor has certain drawbacks. First, the use of such a hypervisor deteriorates the performance of the system, since this tool consumes resources. This may also harm "real-time" constraint aspects associated with certain applications. Furthermore, this type of equipment is currently very expensive to acquire.

The aim of the invention is consequently to propose a method for selecting a virtual slot within a virtual machine so as to run an application instance therein, automatically and autonomously, without requiring the use of complex dedicated equipment or software to that end.

BRIEF DESCRIPTION OF THE INVENTION

To that end, the invention relates to a method for selecting a virtual slot to start up an instance of an application in a distributed system comprising a plurality of physical machines distributed on a network, each physical machine housing at least one virtual machine, and each virtual machine comprising at least one virtual slot for running an application instance in said virtual machine.

Said method comprises selecting a virtual slot for starting up an application instance including the following steps:
  determining a set of free application slots, i.e., those not occupied by an application instance in use,
  computing a score for each free virtual slot, the score computation depending on at least one constraint,
  selecting the virtual slot to start up the considered application instance, said selected virtual slot being that having the best score.

Advantageously, when a user has requested the opening of an application, the score for a free virtual slot is computed at least from a first application constraint, and the evaluation of the first application constraint associated with said free virtual slot consists on the one hand of determining whether the requested application is already open in said considered free virtual slot, and on the other hand of awarding a score associated with the first application constraint as a function of that determination.

Advantageously, the method according to the invention is carried out in a distributed system capable of running a set of applications cooperating with a set of equipment distributed on the network.

Advantageously, the score of a free virtual slot can be computed from at least one network constraint, and, the instance of the application to be started being designed to cooperate with equipment on the network, evaluating the network constraint associated with said free virtual slot consists on the one hand of determining whether that equipment is reachable, via the network, from the virtual machine housing said free virtual slot, and on the other hand awarding a score associated with the network constraint as a function of that determination.

Advantageously, the method according to the invention is implemented in a distributed system capable of running at least two different versions of the requested application, and when the user has requested the opening of a given version of an application, the score for a free virtual slot is computed at least from a second application constraint, and the evaluation of the second application constraint associated with said free virtual slot consists on the one hand of determining whether, when the requested application is already open in said considered free virtual slot, the version of said open application is indeed the requested given version, and on the other hand awarding a score associated with the second application constraint as a function of that determination.

Advantageously, when a user has requested the opening of a given project in an application, the score of a free virtual slot can be computed at least from a first project constraint, and the evaluation of the first project constraint associated with said free virtual slot consists on the one hand of determining whether, when the requested application is already open in said considered free virtual slot, the requested given project is already open, and on the other hand, awarding a score associated with the first project constraint as a function of that determination.

Advantageously, when a user has requested the opening of a given project in an application, the score of a free virtual slot can be computed from at least one second project constraint, and the evaluation of the second project constraint associated with said free virtual slot consists on the one hand of determining, when the requested application is already open in said considered free virtual slot, and a project is already open in said requested application that does not correspond to the requested given project, how many times said project that is already open has been opened, and on the other hand awarding a score associated with the second project constraint as a function of that determination.

Advantageously, when a user has requested the opening of an application, a score for a free virtual slot can be computed at least from a user interface constraint, and the evaluation of the user interface constraint consists on the one hand of determining whether said requested application requires the availability of a given peripheral, and on the other hand of awarding a score associated with the user interface constraint as a function of that determination.

Advantageously, the computation of the score of a free virtual slot depends on multiple constraints.

Advantageously, each constraint is associated with a cost and the score is equal to the sum of the costs associated with each of the constraints.

Advantageously, each cost associated with a constraint may be zero, infinite or have a value equal to a predefined finite value.

BRIEF DESCRIPTION OF THE FIGURES

Other features and advantages will appear in the following detailed description done in reference to the appended drawings, which show.

DETAILED DESCRIPTION OF THE INVENTION

Figure 1:
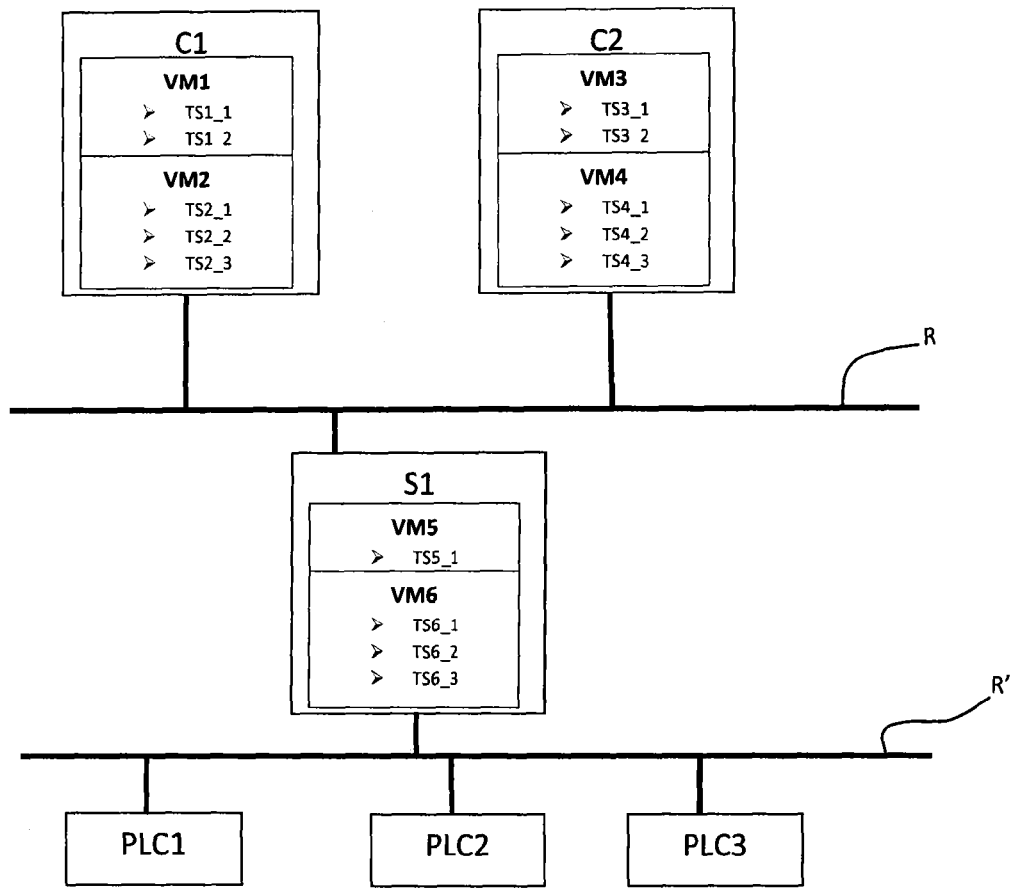
FIG. 1: the diagram of a distributed system using the method according to the invention.

FIG. 1 shows a diagram of a distributed system comprising client stations C1, C2, on a communication network R, a server S1, and industrial equipment PLC1, PLC2, PLC3 on an industrial network R', the communication R and industrial R' networks being interconnected with the server S1 or a set of servers.

Each client station C1, C2 and each server S1 can house one or more virtual machines VM1, VM2, VM3, VM4, VM5, VM6, said virtual machines being able to run applications. To that end, each virtual machine comprises one or more "application slots" TS1_1, TS1_2, . . . , TS6_3, said application slots corresponding to predefined virtual slots in terms of resources—memory, computing power of a processor, etc.—in which applications are designed to be run. In other words, an "application slot" is therefore a reserved location within a virtual machine VM1, VM2, VM3, VM4, VM5, VM6, and for which a set of resources of said virtual machine is reserved.

From a client station C1 or C2, a user can request that an application be run. The application may optionally be required to interact with equipment, for example a machine of the industrial network R', PLC1 or PLC2 or PLC3. Furthermore, the application may cause the opening, editing, running, creation, etc. of the project in the context of the application.

The method according to the invention relates to the selection of a slot for starting up an instance of an application upon request from a user. The selection consists of a selection loop applied to all of the "free," i.e., not "used," application slots, which means that they are not occupied by an instance of an application in use.

Figure 2:
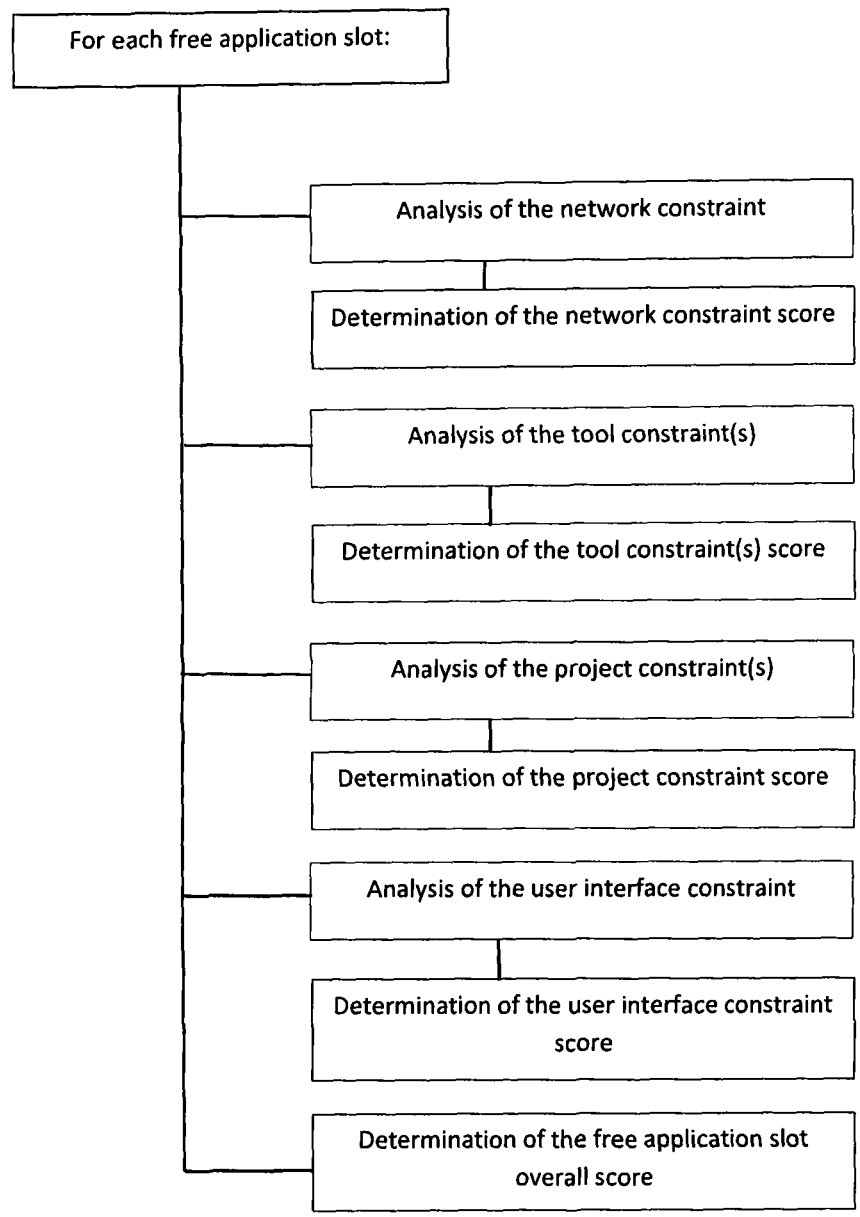
FIG. 2: a block diagram illustrating the steps of one preferred embodiment of the method according to the invention.

FIG. 2 illustrates an example of a selection loop applied to each free application slot based on the computation of an overall score done by each of said free application slots, the overall score being determined from scores done with respect to a set of constraints that it has been chosen to take into account.

Thus, said selection loop comprises computing an overall score to determine the best slot to house the requested application instance. This overall score is computed, for each free application slot, as a function of its resistance to a set of constraints. According to one embodiment of the invention, four types of constraints are taken into consideration: a constraint related to the network, a constraint related to the concerned application, a constraint related to the concerned project or document, if applicable, and a constraint related to the user interface, if applicable.

According to one particular embodiment of the invention, the score for each slot corresponds to a resistance computation with respect to the constraints listed above. Thus, a cost is allocated as a function of the greater or lesser resistance of the considered application slot to the concerned constraint; the higher the resistance, the higher the allocated cost, and the worse the score. According to this embodiment, it is the lowest score, corresponding to the lowest resistance, that determines the slot selected to run the requested application instance.

The "network constraint" consists of determining whether a piece of equipment designed to cooperate with the requested application instance is situated in a location of the network that is in fact reachable from a considered application slot.

A constraint regarding the name of the application for which startup of an instance has been requested may be used. In an industrial automation context, the concerned applications may for example be supervisory, monitoring, or editing applications for robot programs. In the rest of this description, this constraint will be called the "first application constraint."

For a given application name, several versions may coexist within a complex distributed system. Consequently, a second constraint related to the application for which startup of an instance is requested may relate to the version number of the considered application. In the rest of this description, this constraint will be called the "second application constraint."

Generally, the opening of an application causes the creation, editing or running of a project, or the opening, publication of a document. If this is the case, one constraint may relate to the fact that the project or document requested by the user is already open using the desired application, in the considered application slot, or not. In the rest of this description, this constraint will be called the "first project constraint."

If the considered application slot already houses an instance of the requested application, but the project or document already opened using the application is not the desired one, an optional "second project constraint" may consist of accounting for the number of times that open project or document has already been opened using said application. In fact, the constraint will be greater, i.e., more penalizing if, to open the project or document desired by the user, it involves closing a project or document it has accessed many times than closing a project or document that has rarely been edited.

Lastly, a constraint related to the need to have a user interface may also be taken into account. This in particular involves taking into account the uniqueness of the keyboard/mouse pair, or any other type of peripheral, associated with the client station. In the rest of this description, this constraint will be called the "user interface constraint."

According to the preferred embodiment of the method according to the invention, the taking into account, for each free application slot, of the constraints that have been chosen to be taken into account is done by computing a score. According to this preferred embodiment, for each application slot, a score is awarded to each constraint, corresponding to the cost associated with the resolution of said constraint. This cost may range between 0 and +∞, going from the zero constraint, meaning that the concerned constraint has already been resolved for the considered application slot, to the infinite constraint, meaning that the concerned constraint cannot be resolved in the context of the considered application slot.

Between these two extremes, costs may be assigned, for each free application slot, and each of the constraints taken into account. The easier the constraint is considered to resolve, the lower the cost assigned to it, and vice versa.

When an infinite cost is assigned to a constraint, the concerned application slot cannot be selected.

When all of the free application slots have obtained their final score, corresponding to the sum of the costs assigned to each constraint taken into account, it is the slot having obtained the best score, i.e., in the case at hand, the lowest total, that is selected. This selected application slot is consequently made to house the application instance desired by the user.

As an illustration, in the context of the implementation of the preferred embodiment of the method according to the invention, scores must be defined associated with the different types of constraint mentioned above.

Regarding the network constraint, a zero score is assigned to the free application slot belonging to a virtual machine capable of reaching the piece(s) of equipment of the network which the requested application instance must be able to access. If the or one of the pieces of equipment of the network which the requested application instance must be able to access is not reachable from the virtual machine housed in the considered application slot, then the cost associated with the network constraint is equal to $+\infty$. In that case, the considered application slot is eliminated and will not be able to be selected.

Regarding the first application constraint, a zero cost is assigned to the considered application slot if the requested application is already open in the considered slot. If the requested application is not already open in the considered slot, a cost different from 0 and different from $+\infty$ is defined, for example, arbitrarily, the value 80.

The second application constraint is evaluated in the case where the first application constraint has been associated with a zero cost. This involves evaluating whether it is indeed the version of the application desired by the user that is open in the considered slot. If it is, the associated cost is zero; otherwise, a cost equivalent to the preceding case regarding the first application constraint is assigned to the considered application slot, for that second application constraint, or for example the value 80.

The first project constraint is similar to the first application constraint. For the considered free application slot, if, in the requested application already being run, the project desired by the user is already open, the cost of the first project constraint is zero. If the desired project is not already open, a cost different from 0 and different from $+\infty$ is defined, for example, arbitrarily, the value 40. In fact, the cost associated with resolving the first project constraint is preferably lower than the cost of resolving the first application constraint, since the opening of the project in an application that is already open is a priori lower than starting up a new application from scratch. However, the determination of the cost associated with a specific constraint must be evaluated on a case-by-case basis.

The second project constraint is optional. It involves evaluating the extent to which closing the project in order to open the project desired by the user is penalizing, insofar as the requested application is already open in the considered application slot. It is in fact probable that, when a project has been published many times, the cost of closing that project is greater than the cost associated with closing a project that is rarely accessed. For example, it is possible to assign a cost equal to 20 when the open project, potentially needing to be closed, has been edited 10 times since the system was started, and a cost equal to 5 when the open project, potentially needing to be closed, has only been edited once.

The user interface constraint is particular. As was described, it in particular involves taking into account the uniqueness of the keyboard/mouse pair associated with a physical machine. Thus, the method according to the invention may provide that in the case where a physical machine houses a virtual machine whereof an application slot is occupied by an application instance being used by a first computer and requiring the availability of the keyboard and mouse associated with said virtual machine, then no other application slot of the virtual machine, or even, optionally, of the physical machine housing it, can be selected to run an application instance upon request by a second user, also requiring the availability of the keyboard and mouse. Thus, when an application slot of a virtual machine runs an application instance during use by a first user and requiring the availability of the keyboard and the mouse associated with said virtual machine, the set of application slots of the virtual machine, or even of the physical machine housing it, are uniformly marked as having an infinite resistance, i.e., an infinite cost, with respect to the user interface constraint when a user different from the first user requests an application slot to run an application instance also requiring the availability of the keyboard and the mouse. This computer marking lasts until all of the application slots of the considered virtual machine, or even of the physical machine housing it, have been freed by the first user of any application requiring the availability of the keyboard and mouse.

Said user interface constraint is zero in other cases.

Taking each constraint and the computation of an overall score into account, as shown in FIG. 2, makes it possible to determine the free application slot with the best score. This application slot is consequently selected to run the application instance requested by the user.

Furthermore, to carry out the method according to the invention, a resource manager may be provided. This component is in particular capable of applying the selection loop previously described and resulting in selecting an application slot to run an application instance requested by a user. It is also this resource manager that manages the "free" or "used" status of the different application slots. Thus, when an application slot has been selected to run an application instance, the resource manager goes from the state of said application slot to the "used" state. Reciprocally, when the user indicates that he is no longer using an application instance, the resource manager goes from the state of said application slot to the "free" state. When the system is started up, all of the application slots of all of the virtual machines of all of the physical machines are a priori started in the "free" state.

In summary, in a distributed system comprising a plurality of physical machines housing virtual machines comprising virtual slots, called application slots in the present description, to run application instances, the method according to the invention makes it possible to independently select an application slot from among the plurality of free application slots as being the best application slot capable of running an application instance upon request by a user.

The invention claimed is:

1. A method for selecting a virtual slot to start up an instance of an application in a distributed system comprising a plurality of physical machines distributed on a network, each physical machine housing at least one virtual machine, and said each virtual machine comprising at least one virtual slot for running an application instance in said each virtual machine, at least one of said at least one virtual machine comprising a plurality of virtual slots, said method comprising:

selecting one of said at least one virtual slot for starting up said application instance, a user having requested said starting up of said application instance, said selecting including:

computing a score for each virtual slot among said at least one virtual slot, each of said at least one virtual slot being predefined as a location within a virtual machine for which a predefined set of resources of said virtual machine is reserved, said resources comprising computing capacities and memory capacities and in which applications are to be executed, said score for each of said at least one virtual slot being computed at least from a first application constraint, wherein said computing the score comprises evaluating said first application constraint associated with each of said at least one virtual slot, said evaluating comprising determining whether another instance of said application for which said user has requested the opening is already open or not in each of said at least one virtual slot, and awarding said score associated with the first application constraint as a function of the determination, selecting the virtual slot among said virtual slots to start up said application instance for which said user has requested the opening, said selected virtual slot being that having the best score, and sending a command to start up said application instance for which said user has requested the opening in said selected virtual slot, wherein said computing and evaluating are performed for said plurality of said virtual slots on at least one of said at least one virtual machine.

2. The method according to claim 1, wherein the distributed system is capable of running a set of applications cooperating with a set of equipment distributed on the network.

3. The method according to claim 2, wherein the score of said at least one virtual slot is computed from a network constraint, and, the application instance to he started being designed to cooperate with equipment on the network, in that evaluating said network constraint associated with said virtual slot comprises determining whether that equipment is reachable, via the network, from the virtual machine housing said virtual slot, and wherein said computing the score comprises awarding said score associated with the network constraint as a function of that determination.

4. The method according to claim 1, wherein the distributed system is capable of running at least two different versions of the application instance, and the user having requested the starting up of said application instance, wherein the score for each of said at least one virtual slot is computed at least from a second application constraint, and in that an evaluation of the second application constraint associated with said at least one virtual slot comprises determining whether, when the requested application is already open in said considered virtual slot, the version of said open application is indeed the requested given version, and wherein said computing the score comprises awarding the score associated with the second application constraint as a function of that determination.

5. The method according to claim 1, wherein, the user having requested opening of a given project in said application instance, the score of each of said at least one virtual slot is computed at least from a first project constraint, and in that an evaluation of the first project constraint associated with each of said at least one virtual slot comprises determining whether, when said another instance of the application is already open in said considered virtual slot, the requested given project is already open, and wherein said computing the score comprises awarding the score associated with the first project constraint as a function of that determination.

6. The method according to claim 4, wherein, the user having requested opening of a given project in said application instance, the score of each of said at least one virtual slot is computed at least from a first project constraint, and in that an evaluation of the first project constraint associated with each of said at least one virtual slot comprises determining whether, when said another instance of the application is already open in said virtual slot, the requested given project is already open, and wherein said computing the score comprises awarding the score associated with the first project constraint as a function of that determination.

7. The method according to claim 1, wherein, the user having requested opening of a given project in said application instance, the score of each of said at least one virtual slot is computed from at least one second project constraint, and in that an evaluation of the second project constraint associated with each of said at least one virtual slot comprises determining, when said another instance of the application is already open in said considered virtual slot, and a project is already open in said another instance of the application that does not correspond to the requested given project, how marry times said project that is already open has been opened, and wherein said computing the score comprises awarding a score associated with the second project constraint as a function of that determination.

8. The method according to claim 6, wherein, the user having requested opening of a given project in said application instance, the score of each of said at least one virtual slot is computed from at least one second project constraint, and in that an evaluation of the second project constraint associated with said virtual slot comprises determining, when said another instance of the application is already open in said considered virtual slot, and a project is already open in said another instance of the application that does not correspond to the requested given project, how many times said project that is already open has been opened, and wherein said computing, the score comprises awarding the score associated with the second project constraint as a function of that determination.

9. The method according to claim 1, wherein the score for each of said at least one virtual slot is computed at least from a user interface constraint, and an evaluation of the user interface constraint comprises determining whether said application instance requires the availability of a given peripheral, and wherein said computing the score comprises awarding the score associated with the user interface constraint as a function of that determination.

10. The method according to claim 8, wherein the score for each of said at least one virtual slot is computed at least from a user interface constraint, and an evaluation of the user interface constraint comprises determining whether said application instance requires the availability of a given peripheral, and wherein said computing the score comprises awarding the score associated with the user interface constraint as a function of that determination.

11. The method according to claim 1, wherein the computation of the score of said at least one virtual slot depends on multiple constraints.

12. The method according to claim 10, wherein the computation of the score of the said at least one virtual slot depends on multiple constraints.

13. The method according to claim 11, wherein each constraint is associated with a cost and the score is equal to the sum of the costs associated with each of the constraints.

14. The method according to claim 13, wherein each cost associated with a constraint may be zero, infinite or have a value equal to a predefined finite value.

* * * * *